Patented Feb. 27, 1934

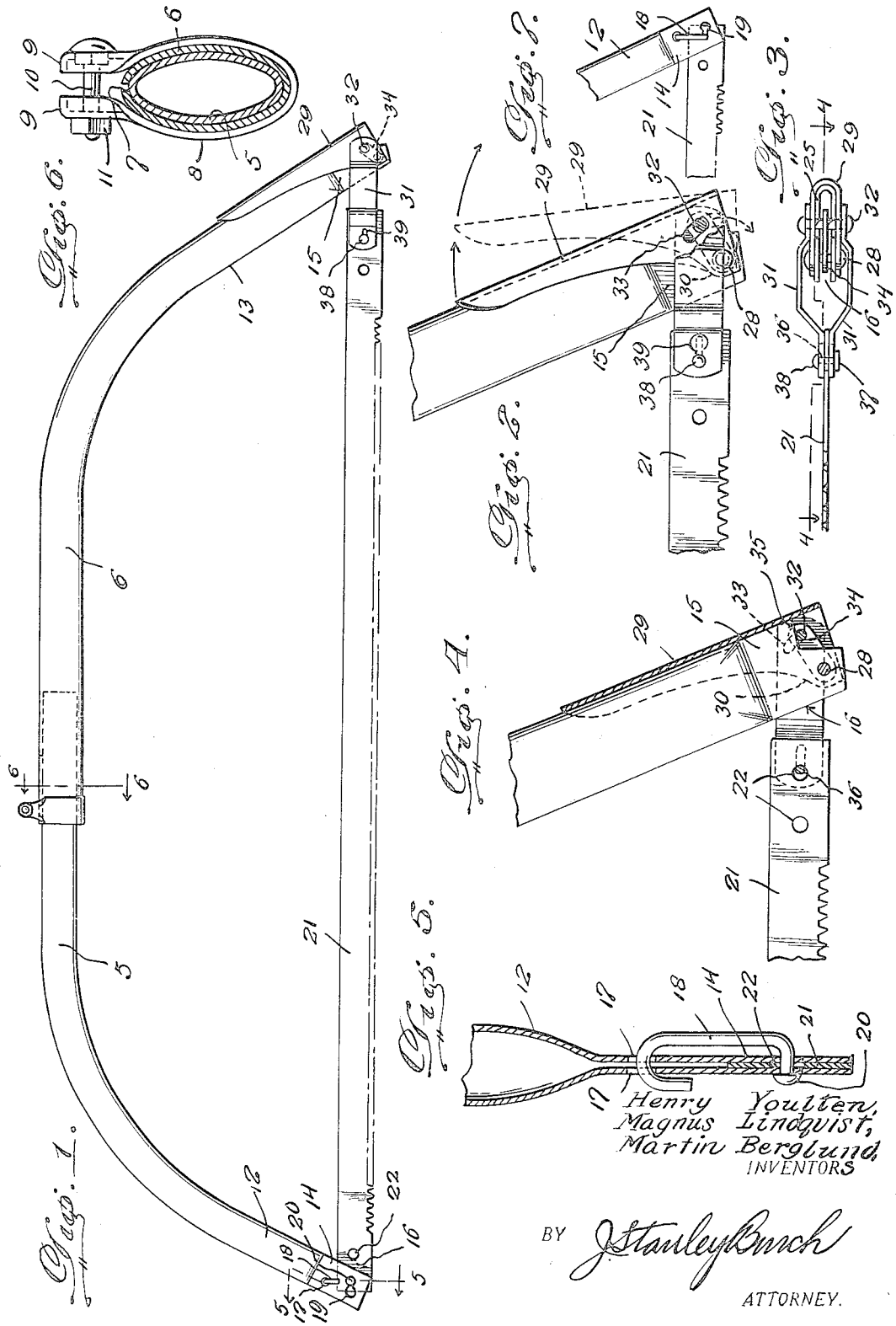

1,949,196

UNITED STATES PATENT OFFICE 1,949,196

SAW

Henry Youlten, Magnus Lindqvist, and Martin Berglund, Virginia City, Mont., assignors, by direct and mesne assignments, of one-eighth to Clarence H. Petersen, three-eighths to John Lindquist, one-eighth to Bertoglio and McTaggart Storage Company, all of Butte, Mont., and three-eighths to said Magnus Lindqvist Application February 18, 1933. Serial No. 657,424

2 Claims. (Cl. 145—34)

This invention relates to improvements in saws of the adjustable U-frame type, and an important object of the invention is to provide a saw of this character having a frame which is extremely simple and durable in construction and which may be readily adjusted to the desired length and effectively secured in adjusted condition.

A further object of the present invention is to provide a saw of the above character with improved means for detachably connecting one end of the saw blade with an end of the saw frame.

A further object of the present invention is to provide a saw of the above kind with improved means for manually placing the saw blade under tension.

Other objects and important features of the invention will become apparent from the following description when considered in connection with the accompanying drawing, and the invention consists in the novel form, combination and arrangement of parts hereinafter more fully described, shown in the drawing and claimed.

In the drawing:

Figure 1 is a side elevational view of a saw embodying the present invention.

Figure 2 is an enlarged fragmentary side elevation of the end of the saw provided with means for placing the saw blade under tension, parts being broken away and in section.

Figure 3 is a bottom plan view of the construction shown in Figure 2.

Figure 4 is a fragmentary view partly in side elevation and partly in section, taken on line 4—4 of Figure 3.

Figure 5 is an enlarged fragmentary section on line 5—5 of Figure 1.

Figure 6 is an enlarged transverse section on line 6—6 of Figure 1; and

Figure 7 is a fragmentary side elevation looking toward the left of Figure 5 and drawn on a reduced scale.

Referring more in detail to the drawing, the present saw includes a frame which is adjustable in length to accommodate saw blades of varying lengths, or to facilitate connection of the saw blade with the frame preparatory to placing the same under tension, and this frame consists of two tubular sections 5 and 6, one slightly smaller than and slidably fitted within the other. The outer section 6 has its inner end portion split or slotted longitudinally as at 7, and fitted around this end of the outer frame section 6 is a clamping ring or band 8 having apertured opposed ends 9 receiving a clamping bolt 10 upon which is threaded a nut 11. Obviously, by tightening the nut 11 the clamping ring 8 will be contracted so as to contract the adjacent split end of the outer section 6 into tight gripping engagement with the adjacent end of the inner section 5 so as to secure the frame sections 5 and 6 in any position to which they are relatively adjusted. This means for securing the frame sections in adjusted relation is quite positive in action, and it will be apparent that by loosening nut 11, the frame sections may be released for relative adjustment. The sections 5 and 6 are of non-circular form in cross section, preferably of oval cross section as shown in Figure 6 so as to provide great strength and avoid any possibility of axial relative turning of the frame sections. The outer ends of the frame sections are turned downwardly as at 12 and 13 in a plane parallel with the major diameter of the frame sections, the outer terminals of the frame sections being flattened as at 14 and 15, and these flattened end portions being longitudinally slotted at their inner sides, at the points generally indicated at 16.

The flattened terminal or end portion 14 has alined transverse openings 17 loosely receiving the hook-shaped end of a substantially C-shaped blade securing element 18, whereby the latter is attached to the frame section 5 for pivotal movement both laterally and longitudinally of the saw. The flattened portion 14 is further provided with transversely alined key-hole slots 19 below the openings 17 to removably receive the other or lower end of the securing element 18, said lower end of the element 18 extending laterally through the slot 19 and provided with a terminal head 20 of a diameter greater than the inner narrower portions of the key-hole slots 19 and slightly smaller than the diameter of the larger outer portions of said slots 19. The saw blade 21 is of ordinary form provided at the ends with circular openings 22 to faciliate connection of the ends of said blade with the ends of the saw frame, openings 22 being of a diameter similar to the diameter of the larger outer ends of key-hole slots 19. It will be seen that slight movement of the blade 21 toward the left of Figure 1 will cause swinging movement of the securing element 18 so as to position the lower end of the latter in the outer larger portions of key-hole slots 19. When the element 18 is thus positioned, it may be swung laterally to remove the lower end of element 18 from the slots 19 and the adjacent opening 22 of saw blade 21, thereby releasing the adjacent end of the saw blade, the head 20 of element 18 passing through the larger ends of slots 19 and the opening 22 of blade 21 in which the adjacent end of element 18 was engaged. A reversal of this operation will obviously secure the adjacent end of the blade to the frame with the parts positioned as in Figures 1 and 5, and it will be seen that securing element 18 is effectively attached to the frame section 5 by the hook-shaped upper end thereof so as to insure against accidental detachment and loss of the element 18. Obviously, when the element 18 is in its operative position of Figure 1, the head 20 may not pass laterally through the narrower inner portions of key-hole slots 19, thereby preventing accidental detachment of the adjacent end of blade 21 from the adjacent end of the saw frame while the blade 21 is placed under tension at the opposite end of the saw frame by a means to be presently described.

Passing transversely through the lower portion of the flattened end portion 15 of frame section 6 adjacent the inner edge of portion 15 is a pivot pin 28, and fitted over the outer edge of the adjacent end of frame section 6 is a sheet metal hand lever 29 of U-shape cross section having inwardly extending arms 30 at its lower end through which the pivot pin 28 passes for pivotally mounting the lever 29 on the frame section 6. A pair of links 31 are also pivotally engaged at their outer ends with the ends of a pivot pin 32 that passes through arcuate slots 33 in the sides of hand lever 29 concentric with pivot pin 28 outwardly of the latter. Arranged within the flattened portion 15 is a link 34 pivotally engaged at its ends with the pivot pins 28 and 32, and the outer free corner portion of flattened portion 15 is cut away to provide a substantially horizontal shoulder 35 above a plane intersecting the pivot pin 28 and in a position to be engaged by the pivot pin 32 to limit upward movement of pivot pin 32 and links 31 and 34 to a plane above the pivot pin 28. Extending transversely through the inner ends of links 31 is a pin 36 having a head 37 at one end larger than the openings in the links 31 and the adjacent openings 22 in blade 21, and provided with a head 38 at the opposite end slightly smaller than the opening in the adjacent link 31 and the openings 22 in blade 21. In other words, one of the links 31 has a key-hole slot or opening 39 whose outer larger portion is of greater diameter than the head 38 and whose inner narrower portion is of lesser diameter than the head 38, while the slot or opening in the other link 31 is of a smaller width or diameter than the head 38 so that the pin 36 is permanently connected to one link 31 and detachably engaged with the other link 31 and the saw blade 21. By moving the blade 21 to the right of Figures 1, 2 and 4, the pin 36 will be moved correspondingly to aline the head 38 with the larger outer end of key-hole slot 39 in one of the links 31 so that the pin 36 may be moved transversely out of engagement with one link 31 and the blade 21 to permit detachment of the adjacent end of the latter from said links 31. A reversal of this operation will of course be necessary to effect connection of the adjacent end of blade 21 with links 31.

In operation, the ends of the blade 21 are connected to the free outer end of frame section 5 and to the links 31, after which the frame is adjusted so as to place the blade 21 in a straight condition. The lever 29 is then swung upwardly and inwardly against the outer side of frame section 6 as shown by full lines in Figures 1, 2 and 4. This places the blade 21 under considerable tension so that the saw may operate efficiently. It will be particularly noted that movement of lever 29 to the operative position of Figure 4 causes the blade 21 to assume a position with its longitudinal axis above the pivot 28 so that the tension of the blade 21 acts to hold the lever 29 in this operative position of the same, the pin 32 being also above a horizontal plane intersecting pivot 28 when engaged with the stop shoulder 35. In this way, no separate securing means is necessary for maintaining the lever 29 in its upwardly and inwardly swung operative position wherein the same maintains the blade 21 under tension. It will further be noted that the arcuate slots 23 in the lever 29 permit limited swinging movement of the latter without affecting the position of links 31 and pin 32 and without releasing the tension of blade 21. This limited outward swinging movement of lever 29 permitted by slots 33 from the full line position of Figure 2 to the dotted line position thereof enables movement of lever 29 out of engagement with frame section 6 so that it may be firmly gripped for subsequently being swung outwardly and downwardly to release the tension of blade 21 by causing movement of pivot 32 and links 34 below a horizontal plane intersecting pivot 28 and inwardly nearer to a vertical plane intersecting said pivot 28. The latter of course permits sufficient inward movement of links 31 to release the tension of blade 21 as stated. Obviously, when the tension of blade 21 is thus released, said blade may be shifted longitudinally relative to the frame to permit the disconnection of the ends of the blade from the frame as explained above. The frictional engagement of lever 29 with frame section 6 and links 31 is sufficient to hold the lever 29 in the position of Figure 1 and against accidental swinging movement from the full line position of Figure 2 to the dotted line position of the latter, although permitting such movement of lever 29 manually.

From the foregoing description, it will be seen that we have provided a very simple, durable and efficient saw of the U-frame type in which improved means are provided to secure adjustment of the frame sections relative to each other, to detachably connect the ends of the saw blade to the ends of the frame, and to place the saw blade under tension after connection of the ends thereof with the frame. Minor changes are contemplated within the spirit and scope of the invention as claimed.

What we claim as new is:

1. In a saw of the character described, a U-frame composed of two tubular sections slidably fitted one within the other and having means for releasably securing the same against relative movement, the outer end of one frame section being flattened laterally and having a longitudinal slot at the inner side of said flattened portion to permit reception of the apertured end of a saw blade between the sides of said flattened portion, said flattened portion having alined openings and being provided with horizontal key-hole slots below said openings, and a C-shaped blade securing element having a hooked upper end loosely engaged in said openings for pivotal movement relative to the frame section longitudinally and laterally of the latter, the lower end of said blade securing element extending laterally through the key-hole slots and having a terminal head of a diameter larger than the inner narrower portions of said key-hole slots and slightly smaller than the diameter of the larger outer portions of said slots, whereby said securing element may be swung longitudinally outwardly relative to the frame sections and then laterally relative to the latter to effect disconnection of the adjacent end of the saw blade from the frame.

2. In a saw of the character described, a U-frame composed of two tubular sections slidable one within the other at their inner ends, means for securing the frame sections in relative positions of adjustment, one of said frame sections having a laterally flattened outer end portion cut away at the outer free corner to provide a substantially horizontal shoulder, a hand lever having inwardly extending arms, a pivot pin passing through the free inner corner portion of said flattened portion and said arms of the lever, said lever having arcuate slots in the sides thereof outwardly of and concentric with said pivot pin, a further pivot pin passing through said arcuate slots below said shoulder of the frame section, a link within the flattened part of the frame section pivotally engaged with both of said pivot pins, and links at the outer sides of the lever pivotally engaged at their outer ends with the second-named pivot pin and provided at their inner ends with means for detachably connecting the same with the adjacent end of a saw blade, said shoulder being arranged above a horizontal plane intersecting the first-named pivot pin to form a stop for the latter whereby the tension of the saw blade will retain the lever in a position swung upwardly and inwardly against the outer side of the adjacent frame section.

HENRY YOULTEN.
MAGNUS LINDQVIST.
MARTIN BERGLUND.